United States Patent
Liao et al.

(10) Patent No.: US 9,799,150 B2
(45) Date of Patent: Oct. 24, 2017

(54) SYSTEM AND METHOD FOR SHARING REAL-TIME RECORDING

(71) Applicant: SanJet Technology Corp., Hsin Chu (TW)

(72) Inventors: Steve Liao, Hsin Chu (TW); Mark Sung, Taipei (TW); Danny Lin, Taipei (TW)

(73) Assignee: SANJET TECHNOLOGY CORP., Hsin Chu (TW)

( * ) Notice: Subject to any disclaimer, the term of this patent is extended or adjusted under 35 U.S.C. 154(b) by 214 days.

(21) Appl. No.: 14/579,868

(22) Filed: Dec. 22, 2014

(65) Prior Publication Data

US 2015/0179002 A1 Jun. 25, 2015

(30) Foreign Application Priority Data

Dec. 23, 2013 (TW) .............................. 102147831 A

(51) Int. Cl.
| | |
|---|---|
| H04N 9/47 | (2006.01) |
| H04N 7/18 | (2006.01) |
| G07C 5/00 | (2006.01) |
| G08G 1/04 | (2006.01) |
| G07C 5/08 | (2006.01) |
| H04N 1/00 | (2006.01) |
| H04N 5/765 | (2006.01) |

(Continued)

(52) U.S. Cl.
CPC .......... *G07C 5/008* (2013.01); *G07C 5/0866* (2013.01); *G08G 1/04* (2013.01); *H04N 1/00244* (2013.01); *H04N 5/765* (2013.01); *H04N 5/772* (2013.01); *H04N 2101/00* (2013.01); *H04N 2201/0039* (2013.01); *H04N 2201/0055* (2013.01); *H04N 2201/0087* (2013.01); *H04N 2201/0096* (2013.01)

(58) Field of Classification Search
CPC ...... G07C 5/008; G07C 5/0866; H04N 5/772; H04N 5/765; H04N 1/00244; H04N 2201/0055; H04N 2201/0096; H04N 2201/0039; H04N 2201/0087; H04N 2101/00; G08G 1/04; G06T 2207/30236; G06K 2209/15
USPC ........................................................ 348/149
See application file for complete search history.

(56) References Cited

U.S. PATENT DOCUMENTS

| | | | |
|---|---|---|---|
| 8,159,535 B2 * | 4/2012 | Kitani ...................... | H04N 7/18 340/995.13 |
| 2013/0242104 A1 * | 9/2013 | Wang ....................... | G08G 1/04 348/149 |

(Continued)

*Primary Examiner* — Jared Walker
(74) *Attorney, Agent, or Firm* — Muncy, Geissler, Olds & Lowe, P.C.

(57) ABSTRACT

This invention provides a system for sharing real-time recording and the method thereof. The system in this invention transmits the traffic image from the traffic recording device to the cloud server database for storage by the hand-held communication device. Here, the system for sharing real-time recording includes at least three parts: a traffic recording device, a hand-held communication device and a cloud server. User can automatically transmit traffic image provided by the vehicle event data recorder capable of transmitting traffic image to the cloud server by the system and its method disclosed here to achieve real-time sharing of the traffic images.

9 Claims, 4 Drawing Sheets

(51) Int. Cl.
*H04N 5/77* (2006.01)
*H04N 101/00* (2006.01)

(56) References Cited

U.S. PATENT DOCUMENTS

2013/0308158 A1\* 11/2013 Morita ............... H04N 1/00095
358/1.15
2014/0347396 A1\* 11/2014 Nielsen .................. G07C 5/085
345/634

\* cited by examiner

Link a first wireless transmission module of a traffic recording device to one of a second or a third wireless transmission module of a hand-held communication device, when a real-time sharing image module of the hand-held communication device detects an established connection, download the traffic image in the traffic recording device to the hand-held communication device automatically.

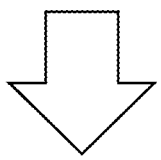

201

Retrieve the traffic image at the hand-held communication device and receive the traffic image with activating the real-time sharing image module automatically by the second processing device, the traffic image is further processed and stored at a first memory.

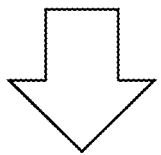

202

Set an online connection between a communication interface of a cloud server and one of a second or a third wireless transmission module and upload the traffic image to a first image database of the cloud server immediately if the real-time sharing image module detects the online connection.

SYSTEM AND METHOD FOR SHARING REAL-TIME RECORDING

BACKGROUND

Nowadays, most vehicle event data recorders (VEDRs) are only capable of storing and photographing, some VEDR have an emergency button, which allows storing the photograph data in the memory of the VEDR, e.g. SD card, for a short period before or after pressing it. The general way is to photograph the traffic condition in one day as image record with a VEDR and store it, then the image record in the VEDR is output or stored at a computer for further image partition so that the user can upload the image content from the specific event happened on some day manually to the cloud network, e.g. Youtube, Facebook or cloud storage, via file transfer protocol software. Such way can not only retain the traffic condition in the event, but also to restore the truth of the event soon to determine the liability if the dispute or traffic accident happens.

However, the above method is complicating and it requires user to retrieve the storage device, e.g. SD card, of the VEDR and insert it to the computer to download or upload to the cloud network of the images. Moreover, the elapsed time of download and upload is much. Generally, the uploaded images are kept as records for personal uses. If the user wishes to share the traffic images with his/her friends, the effect of sharing is limited. Additionally, if the images are uploaded to the public network, a possibility of infringing other's privacy by exposing his/her license plate and appearance occurs.

If the images taken by VEDR are not handled immediately, letting the VEDR filled with the images recording day by day. Such circumstances might bother the user when sorting the images and the images lose their value from immediate sharing. Although one can use his/her cell phone record the traffic accident and upload its images to the cloud network, e.g. Youtube, Facebook or cloud storage, such cloud networks are not capable of sorting the images. Therefore, even if the images of traffic accident are uploaded to the network, it elicits no response. The value from sharing the images drops sharply.

SUMMARY

Considering the above-mentioned problems, the invention disclosed here is to provide a system of sharing real-time recording and its method, users can use the VEDR with traffic images transmission function to transmit the video provided by VEDR to the cloud server by hand-held communication device to share the traffic images immediately.

To reach the above and other purposes, this invention provides system and method of sharing real-time recording. The system of sharing real-time recording in this invention transfers the traffic video, provided by the traffic recording device (e.g., VEDR), to the cloud server database for storage. Here, this system of sharing real-time recording includes three parts: traffic recording device, hand-held communication device and cloud server, wherein the traffic recording device includes: a image capture device coupling with a first processing device (including CPU, buffer, multiplexer and any other processing unit) to capture a traffic image; a first wireless transmission module coupling with the first processing device to transmit the traffic image; a first processing device coupling with the image capture device and the first wireless transmission module to conduct image capture and image transmission. Hand-held communication device 112 includes a real-time sharing image module coupling with a second processing device (including CPU, buffer, multiplexer and any other processing unit) to share the traffic image; a second wireless transmission module and a third wireless transmission module (including Wi-Fi module and RF module) coupling to the second processing unit, wherein one of the second wireless transmission module or the third wireless transmission module receives the traffic image from the first wireless transmission module; and a first image memory coupling to the second processing device to store the processed traffic image after processed by the second processing device; a second processing device coupling with the above-mentioned modules and devices to receive traffic image and conduct image transmission and image storage. Cloud server includes a communication interface connected with the second wireless transmission module and the third wireless transmission module in the hand-held communication device to upload the traffic image to the cloud server; an image conversion module coupling with a third processing device to unify the format of the transmitted traffic image; a first image database coupling with the third processing unit to store the traffic image after processed by the image conversion module.

When the user is about to use this system, it's required to setup the traffic recording device and the hand-held communication device. The VEDR (e.g., VEDR) will proceed to image recording for the whole period after the initialization and store the record at the traffic recording device. The traffic recording device (e.g., VEDR) has a button, when the button is pressed, the traffic image data before or after the accident for an extra short period can be immediately recorded in the traffic recording device. When the hand-held communication device is connected online to the wireless transmission module of the traffic recording device by at least one of its Wi-Fi module and RF module, the real-time sharing image module of the hand-held communication device will be activated automatically so that the image recorded from the whole period and the short period will be transmitted to the hand-held communication device, wherein the hand-held communication can be a cell phone.

Furthermore, the hand-held communication device can not only receive images of the whole period and the extra short period but also receives all GPS record of the traffic image data to locate it to acquire at least one real-time traffic information (e.g., road condition). The real-time sharing image module of this invention can further compare the traffic image, input to the hand-held communication device, with the original image in the traffic recording device to see if duplication exists. When the real-time sharing image module confirms that there is no duplicated traffic image, it continues to download the traffic image immediately. The real-time sharing image module can also update the traffic image in the first image memory of the hand-held communication device automatically.

To achieve the above purposes, this invention also discloses a method for sharing real-time recording, it provides the user with the traffic image given by the VEDR capable of transmitting traffic image by the transmission from the hand-held communication device to the cloud server to share the traffic image. The method for sharing real-time recording includes following steps: (1) setup an online connection between a first wireless transmission module of a traffic recording device and a second wireless transmission module and a third wireless transmission module of a hand-held communication device, when a real-time sharing image module of the hand-held communication device detects the connection, the real-time sharing image module downloads traffic images of a traffic recording device to the hand-held communication device; (2) retrieve the traffic image at the hand-held communication device, then process the traffic image received by the real-time sharing image module with a second processing unit and store the processed traffic image at a first image memory, and; (3) setup an online connection between the second wireless communication module and the third wireless communication module of the hand-held communication device and a communication interface of a cloud server, when the real-time sharing image module detects the connection, the real-time sharing image module upload the traffic image to a first image database of a cloud server.

With the above-mentioned method, this invention permits some functional modules at the cloud server, for instance, a warning module connected to police department. User can use the warning module to call the police while uploading the recorded image of traffic accident and its GPS location to the cloud server so that when an accident occurs, the police department will be warned and deal with the accident immediately. Additionally, this invention can further have an image processing module at the cloud server, fogging the faces and the license plates to prevent other users from infringing privacies while browsing the real-time traffic images the location where the accident happened in the cloud server database. To avoid the privacy issues, the image processing module will fog the faces and the license plates then store the traffic image back to the database, hence the faces and the license plates on the traffic image retrieved by any users has been fogged.

To share the content of cloud server database to the users completely, the traffic image in the database can be utilized with load balance to enhance the accessibility and the expandability of the application of the server and to share it on community by setting the e-board and page direction with the management program at user terminal.

Before the user is about to use this system, he/she only needs to register his/her account with the hand-held communication device at beginning to complete the login. After completing the login, the user can access to the database of the cloud server.

Those mentioned characteristics above are to describe the purpose, the technical method to achieve the purpose and the advantages of this invention. This invention can be understood with the following better embodiments, its figures and the claims.

BRIEF DESCRIPTION OF THE DRAWINGS

This invention can be known completely by following detailed description and various embodiments of this invention with their figures. However, such explanatory description, embodiments and their figures shall not be considered as the limitation of the scope of this invention.

FIG. 4 is a method flowchart of a system of sharing real-time recording.

DETAILED DESCRIPTION

The following description instructs the method of carrying out this invention with specific and concrete embodiments, a person skilled in this art can easily achieve the efficacy and the advantages of this invention with the content disclosed in this specification. Also, this invention can be utilized or be carried out with other embodiments. Any detail elaborated in this specification can be applied for various demands or be modified within the essence of this invention.

This invention will be described with better embodiments and perspective. Such description only explains the structure of this invention rather than limits the scope of claim in this invention. Hence, this invention can be applied broadly in other embodiments, except those have already been mentioned in this specification.

Figure 1:
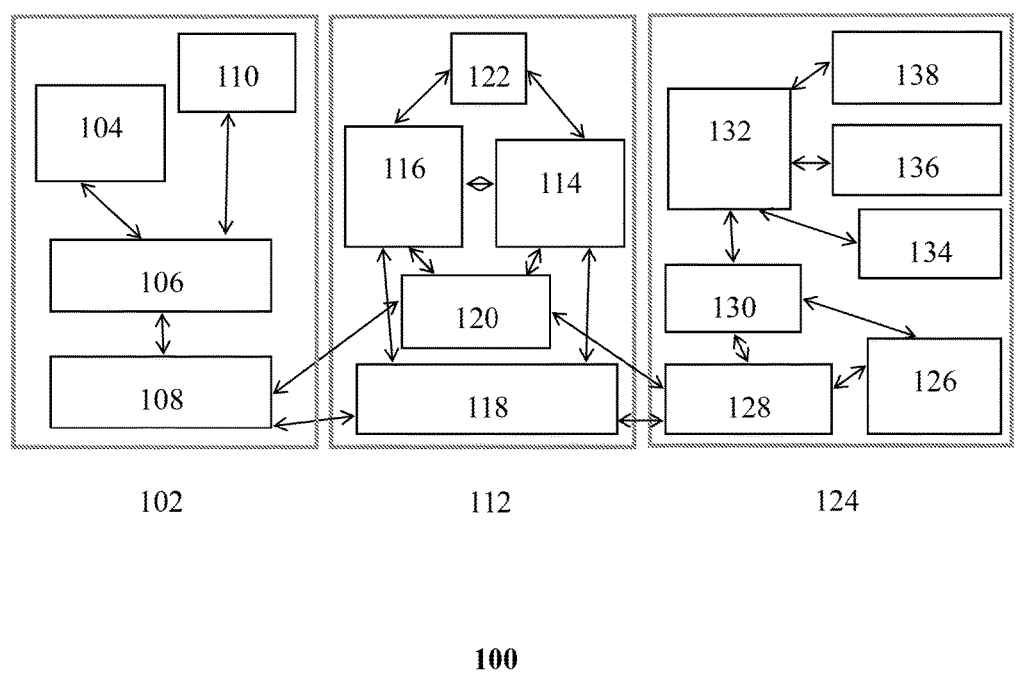
FIG. 1 describes a system for sharing real-time recording, including a traffic record device, a hand-held communication device and a cloud server.

As shown in FIG. 1, the block diagram showing the basic structure and the application of the system for sharing real-time recording 100. In this embodiment, the system 100 includes a traffic recording device 102, a hand-held communication device 112 and a cloud server 124, wherein the traffic recording device 102 includes an image capture device 104, a first processing device 106, a first wireless transmission module 108; the hand-held communication device 112 comprises a second processing device 114, a second wireless transmission module 116, a third wireless transmission module 118, a real-time sharing image module 120 and a first image memory 122, and; the cloud server 124 comprises a third processing device 126, a communication interface 128, an image conversion module 130 and a first image database 132. With the system disclosed here, one can automatically transmit the traffic image from the traffic recording device capable of wireless transmission to the hand-held communication device with the wireless transmission modules (e.g., at least one of Wi-Fi and RF module). Afterwards, the hand-held communication device automatically uploads the traffic image to the cloud server 124, making the traffic image accessible for general users at once.

Furthermore, this invention can store identifiable data for identifying the user, for example, phone number, I.D. number, member account. Also, the hand-held communication device can automatically update the traffic image in the first image memory with its real-time sharing image module.

Please refer to FIG. 1, in some embodiments, the traffic recording device 102 further includes a button 110. When the button 110 is pressed, the first processing device 106, coupling with the image capture device 104, can capture the traffic image for a short period and store it at the first image memory 112. The first wireless transmission module (e.g., at least one of Wi-Fi module and RF module) 108 setup connections among the second 116 and the third wireless transmission modules 108 coupling with the second processing device 114 in the hand-held communication device 112, then the hand-held communication device 112 is able to receive the traffic image sent from the first wireless transmission module 108. When the traffic image arrives at the hand-held communication device 112 and is processed by the second processing device 114, the traffic image is stored at the first image memory 122 coupling with the second processing device 114. In one another embodiment, the e-mail address or the SMS account of the receiver in the traffic recording device or the hand-held communication device 112 can be set in advance. When the traffic image is recorded, the traffic image can be transmitted as an e-mail or a SMS message to their receiver by the traffic recording device 102 or the hand-held communication device 112.

Figure 2:
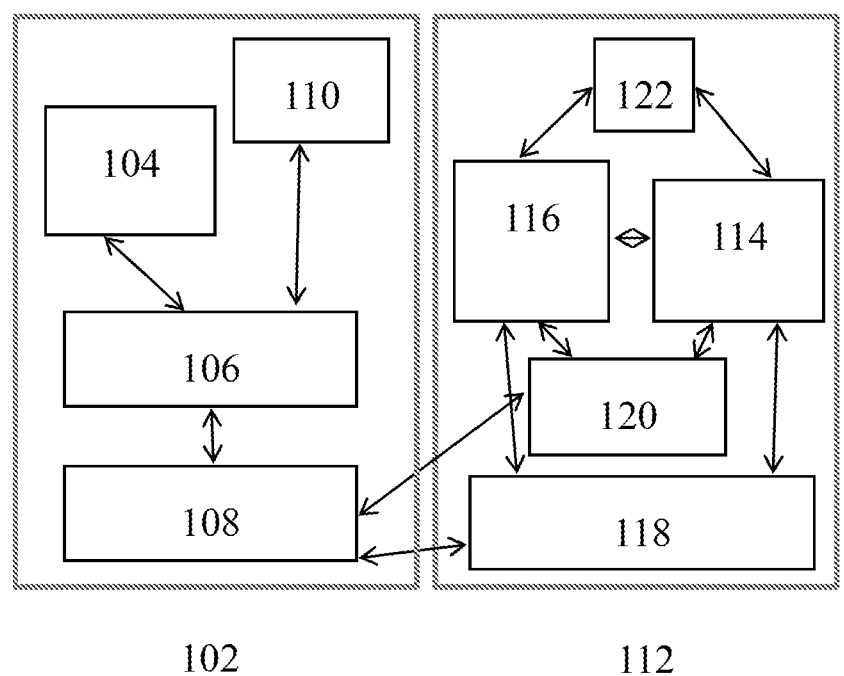
FIG. 2 depicts the data flowchart of an embodiment of massive digital image data transmission between the traffic record device and the hand-held communication device.

Referring to FIGS. 1 and 2, one application of the system disclosed here is that the traffic image in the traffic recording device 102 can be continually transmitted by the real-time sharing image module 120 of the hand-held communication device 112 after the connection among the first wireless transmission module 108, the second 114 and the third wireless transmission module 118 coupling with the second processing unit 114 of the hand-held communication device 112 is set. During the transmission, the real-time sharing image module 120 can further compare the image input into the hand-held communication device 112 with the original image in the device 112 to see if duplication exists. If no duplication exists, the transmission of the traffic image will continue immediately to the hand-held communication device 112. Moreover, when the hand-held communication device 112 is linked to the traffic recording device 102, the GPS record of the image is automatically retrieved for locating.

Figure 3:
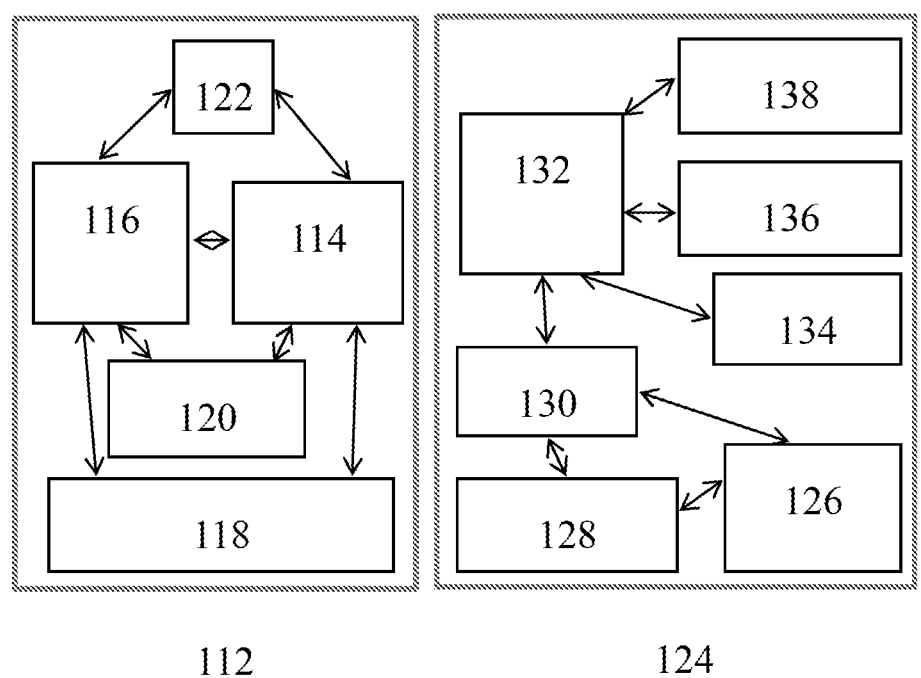
FIG. 3 is a data flowchart of an embodiment of massive digital image data transmission between the hand-held communication device and cloud server.

Next, referring to FIGS. 1 and 3, when the connection between the communication interface 128 of the cloud server 124 and one of the second 116 or the third wireless transmission module 118 is set, the real-time sharing image module 120 of the hand-held communication device 112 will be automatically activated to automatically transmit the traffic image from the hand-held communication device 112 to the cloud server 124. The traffic image will be stored at the first image database 132 after its format is changed by the image conversion module 130 coupling with the third processing device 126.

As mentioned above, in one embodiment, before the user is about to use this system, it is required only to register his/her account to complete the login. After completing the login, the user becomes the member, authorized to automatically upload the traffic image to the cloud server permanently by this system. Moreover, when the user request the cloud server 124 to provide the specific image content (e.g., the traffic condition of certain places at certain time), the cloud server 124 can retrieve the demanded traffic image from the first image database 132 then modify the image with the image processing module 134. Afterwards, the modified image will be stored back to the first image database and be sent to the requester.

Referring to FIG. 4, in correspondence with the above system for sharing real-time recording, the method for sharing real-time recording will be disclosed with Step 201 to 203.

As described in Step 201, the first wireless transmission module of the traffic recording device is linked to one of the second or the third wireless transmission module of the hand-held communication device. When the real-time sharing image module of the hand-held communication device detects the established connection, the traffic image in the traffic recording device will be automatically downloaded to the hand-held communication device. The real-time sharing image module in Step 201 can further compare the traffic image input into the hand-held communication device with the original image in the traffic recording device to see if duplication exists.

As described in Step 202, after the hand-held communication device retrieves the traffic image, the real-time sharing image module will be automatically activated and receive the traffic image from the traffic recording device. The traffic image will be processed by the second processing device then be stored at the first image memory.

As shown in Step 203, the connection between the communication interface of the cloud server and one of the second or the third wireless transmission module is set. If the real-time sharing image module detects the connection, the traffic image will be automatically uploaded to the first image database of the cloud server immediately. In a better embodiment, the cloud server further includes a warning module. User can call the police with the specific traffic image (e.g., traffic accident). In one embodiment, the traffic image of the first image database can be utilized for 3D image positioning.

As mentioned above, this system can be applied for cloud application of traffic record and sharing with certain community. In a better embodiment, as shown in FIGS. 1 to 3, after the user initiates the traffic recording device (e.g., VEDR) 102, when a connection between the first wireless transmission module 108 of the traffic recording device 102 and one of the second 116 or the third 118 wireless transmission device of the hand-held communication device 112 owned by the user is set and the real-time sharing image module 120 detects the connection, the traffic image will be automatically downloaded from the traffic recording device 102 to the hand-held communication device 112. However, when the connection between the traffic recording device 102 and the hand-held communication device 112 is broken, one of the second 116 or the third wireless transmission module 118 will be automatically linked online to the communication interface 128 of the cloud server 124 and the traffic image will be sent to the cloud server 124 and be stored at the first image database 132. The cloud server further includes an image processing module 134, wherein a specific image of the first image database 132 is modified by the image processing module 134, then the specific image after the modification will be stored back to the first image database 132. In one another embodiment, the traffic image in the first image database 132 can be utilized with a load balance 136 to enhance the accessibility and the expandability of the application and be applied with the management program at user terminal to set the e-board and page direction.

The above description is better embodiments of this invention. A person skilled in this art can interpreted this specification as not limiting the scope of the claims of this invention. The scope of the following claims shall be construed with their literal meaning and the equivalents thereof. Any modification or alteration within the scope of the concept of this invention belongs shall be part of this invention and be deemed as within the following claims.

What is claimed is:

1. A system for sharing real-time recording, comprising:
a traffic recording device, including an image capture device coupled to a first processing device to capture a traffic image and a first wireless transmission module coupled to the first processing device to transmit the traffic image; a hand-held communication device, including: a second processing device;
a second wireless transmission module and a third wireless transmission coupled to a second processing device, wherein one of the second wireless transmission module or the third wireless transmission module receives the traffic image from the first wireless transmission module;
a real-time sharing image module coupling coupled to the second processing device to share the traffic image in real time and
a first image memory coupled to the second processing device to store the traffic image processed by an image processing module; and
a cloud server including a third processing device and a communication interface, the communication interface is in connection with one of a second wireless transmission module or a third wireless transmission module to upload the traffic image to the cloud server, wherein the cloud server further comprising:

an image conversion module coupled to the third processing device to modify the format of the traffic image;

wherein the hand-held communication device uses real-time sharing image module to update the traffic image in the first image memory automatically.

2. The system of claim 1, wherein the system compares the traffic image input into the hand-held communication device with the original image in the hand-held communication device to see if duplication exists.

3. The system of claim 1, wherein the hand-held communication device is capable of retrieving a GPS record of the traffic image automatically when linked to the traffic recording device.

4. The system of claim 1, wherein the second wireless transmission module and the third wireless transmission, each of which having at least one of a Wi-Fi module and a RF module, are connected with the first wireless transmission module or the communication interface.

5. The system of claim 1, wherein the traffic recording device includes a button, when the button is pressed, a short period of the traffic image can be stored.

6. The system of claim 1, wherein the traffic image can be transmitted as an e-mail or a SMS message to a receiver by the hand-held communication device or directly by the traffic recording device.

7. The system of claim 1, wherein the cloud server further includes a warning module.

8. The system of claim 1, wherein the cloud server further includes an image processing module capable of fogging faces and licensing plates.

9. The system of claim 8, further comprising a first image database coupled to the third processing device to store the traffic image modified by the image conversion module, wherein the traffic image after modification by the image processing module is stored back to the first image database.

* * * * *